(12) United States Patent
Bozchalui et al.

(10) Patent No.: US 9,026,411 B2
(45) Date of Patent: May 5, 2015

(54) SYSTEMS AND METHODS FOR MICROGRIDS AVAILABILITY EVALUATION USING A MARKOV CHAIN ENERGY STORAGE MODEL

(75) Inventors: Mohammad Chehreghani Bozchalui, Cupertino, CA (US); Ratnesh Sharma, Fremont, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 445 days.

(21) Appl. No.: 13/543,822

(22) Filed: Jul. 7, 2012

(65) Prior Publication Data

US 2013/0080138 A1  Mar. 28, 2013

Related U.S. Application Data

(60) Provisional application No. 61/537,901, filed on Sep. 22, 2011.

(51) Int. Cl.
*G06F 17/50* (2006.01)
*G06F 13/00* (2006.01)

(52) U.S. Cl.
CPC ........ *G06F 17/5004* (2013.01); *G06F 17/5009* (2013.01); *G06F 17/509* (2013.01); *G06F 2217/16* (2013.01); *G06F 2217/78* (2013.01)

(58) Field of Classification Search
USPC ......................... 703/2, 18; 700/291; 455/450
See application file for complete search history.

(56) References Cited

U.S. PATENT DOCUMENTS

| | | | | |
|---|---|---|---|---|
| 2011/0035073 A1* | 2/2011 | Ozog | ............................ | 700/291 |
| 2011/0231028 A1* | 9/2011 | Ozog | ............................ | 700/291 |

OTHER PUBLICATIONS

Barton et al, Energy Storage and Its Use With Intermittent Renewable Energy, IEEE Transactions on Energy Conversion, vol. 19, No. 2, Jun. 2004.
Yokoyama et al, Modeling and Evaluation of Supply Reliability of Microgrids including PV and Wind Power, IEEE 2008.
Kwasinski, Quantitative Evaluation of DC Microgrids Availability: Effects of System Architecture and Converter Topology Design Choices, IEEE Transactions on Power Electronics, vol. 26, No. 3, Mar. 2011.

* cited by examiner

*Primary Examiner* — Thai Phan
(74) *Attorney, Agent, or Firm* — Joseph Kolodka

(57) ABSTRACT

Systems and methods are disclosed for availability evaluation of microgrid systems with an energy storage device by applying a Markov chain model to model charging and discharging processes in the energy storage device; determining an effect of the energy storage device connected to a microgrid with multiple energy sources and loads; and determining effect of system architectures on the availability of microgrids using minimum cut sets (MCS).

20 Claims, 4 Drawing Sheets

SYSTEMS AND METHODS FOR MICROGRIDS AVAILABILITY EVALUATION USING A MARKOV CHAIN ENERGY STORAGE MODEL

The present application claims priority to provisional application Ser. No. 61/537,901 filed Sep. 22, 2011, the content of which is incorporated by reference.

BACKGROUND

The present system relates to microgrid modeling and management tools.

One of the expected advantages of microgrids is having higher availability compared to the current electrical grid. Microgrids use controlled distributed energy resources (DERs) to generate power which makes isolated operation of microgrids possible, thus improving local availability of energy supply. On the other hand, availability becomes more of an issue when greater capacity of renewable energy sources (RESs) are used to generate power within microgrids. This is mostly because of highly variable and intermittent nature of power generation by RESs. Hence, it is necessary to maintain the advantage of high availability that microgrids have even when a large amount of RESs' generation takes place within microgrids.

Energy storage system can improve microgrids availability; however, calculating the amount of improved availability is challenging. This is mainly due to the charging and discharging processes that take place in energy storage system, which makes it difficult to predict how much power is available from energy storage system during microgrids' operation. The presented work in this IR investigates the effect of energy storage systems on the availability of microgrids with different architectures in the presence of RESs.

There are various strategies to improve the availability when RESs are included to generate power; one of the strategies is to add energy storage system. When added, energy storage system can immediately improve microgrids availability; however, calculating the amount of improved availability is not simple and easy. This is mainly due to the charging and discharging processes that take place in energy storage system and makes it difficult to predict how much power is available from energy storage system during microgrids' operation.

SUMMARY

Systems and methods are disclosed for availability evaluation of microgrid systems with an energy storage device by applying a Markov chain model to model charging and discharging processes in the energy storage device; determining an effect of the energy storage device connected to a microgrid with multiple energy sources and loads; and determining effect of system architectures on the availability of microgrids using minimum cut sets (MCS).

Advantages of the system may include one or more of the following. The system considers uncertainty in power generation, power demand, and energy storage within a system. A detailed energy storage model is considered to accurately represent the effect of energy storage in availability of the system. This enables to incorporate system architecture in the availability calculation of a system with energy storage and uncertain demand and supply. The approach of evaluating the microgrids' availability based on using the Markov chain energy storage model and MCS enables to system to evaluate microgrids availability more realistic and accurate than the previous methods which does not take charging and discharging processes into account. The system has the capability of providing easy to interpret metrics to compare various system architectures for a microgrid. This system can calculate the effect of energy storage system connected to a microgrid with multiple energy sources and loads. The system considers the effect of system architectures on the availability of microgrids, which is another important factor that affects microgrids availability. The implementation with the MCS method quickly evaluates how energy storage system takes its role within microgrids with different system architectures that include energy storage system.

DESCRIPTION

Figure 1:
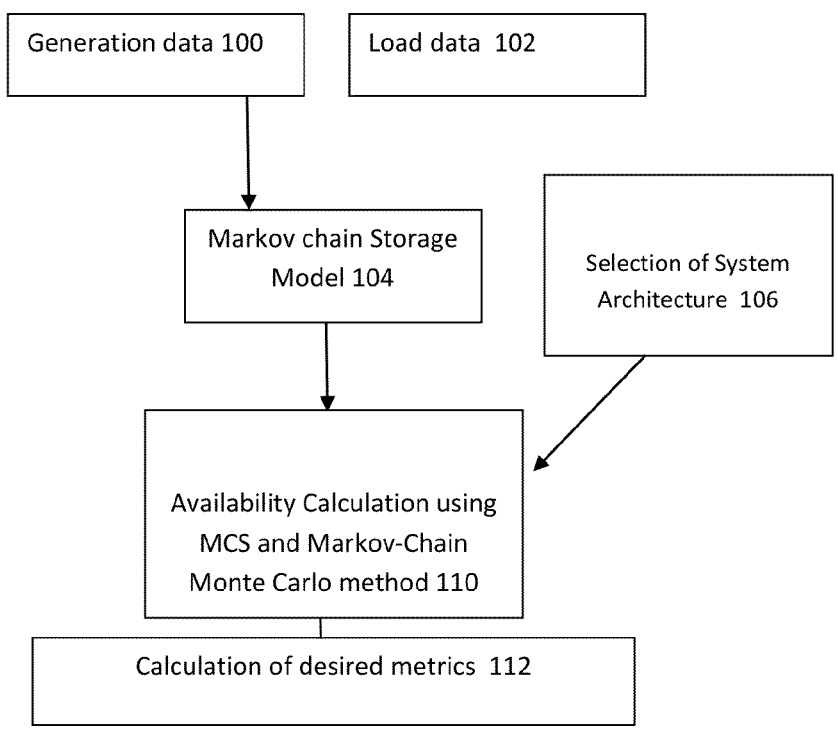
FIG. 1 shows an exemplary framework to perform Availability Evaluation of systems with energy storage in the presence of uncertainty in supply and demand.

FIG. 1 shows an exemplary framework to perform Availability Evaluation of systems with energy storage in the presence of uncertainty in supply and demand. In FIG. 1, energy generation data 100 and load data 102 are provided to a Markov chain storage model 104. The output of the Markov chain storage model 104 is used in a unit 110 that performs availability calculation using MCS and Markov chain Monte Carlo method. The unit 110 also receives a selection of system architecture unit 106. The output of unit 110 is used to determine desired metrics in unit 112.

The availability calculation framework enables more accurate and realistic estimation of availability of a system with uncertain generation and demand in the presence of energy storage devices, while incorporating the system architecture. At the top level, historical data from supply and demand are used to generate the data for the storage model parameters. Uncertainties in weather and environmental conditions can be accounted in the models of energy supply, demand and energy storage. Then, the storage model is used in the selected system architecture to calculate desired availability/reliability indices and metrics.

One embodiment has three main parts: energy storage model for reliability evaluation, availability evaluation of system architecture, then combining these two parts to calculate availability indices. Energy storage model can be either deterministic or probabilistic models. Probabilistic models such as Markov chain modeling can either consider two- or multi-state models for energy storage. In this method, the proposed multi-state model for energy storage devices can more accurately represent its charging and discharging process incorporating uncertainties in demand and supply.

To determine the availability of the system architecture in unit 106, different methods can be used. In the group of the methods that require models of system components, probabilistic methods, which can be either analytical or statistical based calculations, consider uncertainties in different system components' parameters. In one embodiment, either analytical, statistical, or a combination of these methods can be used to calculate system availability indices. One embodiment focuses on combination of Cut set methods and Markov chain Monte Carlo simulation methods to calculate availability indices of different system architectures. The system combines multi-state Markov chain modeling for energy storage, and cut sets and Markov chain Monte-Carlo simulation methods for calculation of system availability indices.

After identifying minimum cut sets, the generated model for the energy storage device from can be incorporated to build the system model considering the energy storage charge and discharge and its uncertainties. Then, Markov chain Monte-Carlo simulation is performed to calculate the availability/reliability indices. The process continues until all the minimum cut sets of the system architecture are covered. Finally, based on the result obtained from each Markov chain Monte-Carlo simulation, availability indices can be calculated. Energy availability metrics of a system such as Loss Of Load Probability (LOLP), Energy Not Supplied (ENS), and Average Loss of Load Duration (ALLD) can be found using this method. The system can also be used to identify critical system components.

Figure 2:
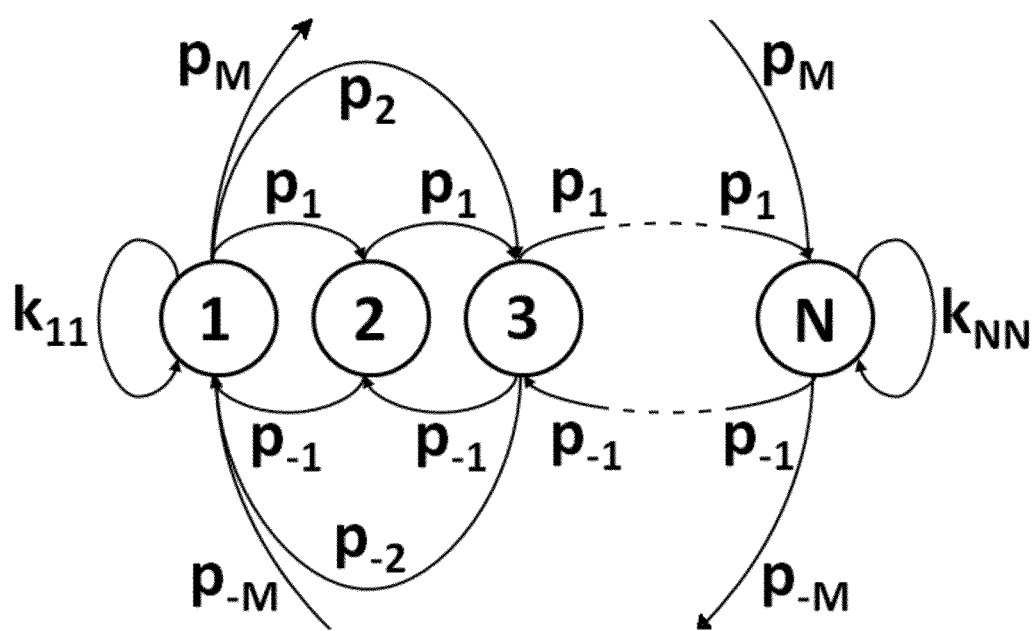
FIG. 2 shows an exemplary battery state diagram which is used to represent the charging and discharging processes in energy storage systems.

Energy storage modeling will be discussed next. A Markov chain based energy storage model is used to evaluate availability. FIG. 2 shows an exemplary battery state diagram which is used to represent the charging and discharging processes in energy storage systems. As shown, the advantage that the presented model has is the ability to model different amount of energy that is charged or discharged.

If the total amount of generated power and load are defined as X and L respectively, the state space of (X−L) for the energy storage system can be expanded as $$S=[-M\Delta,-(M-1)\Delta, \ldots ,-2\Delta,-\Delta,\Delta,2\Delta, \ldots ,(M-1)\Delta, M\Delta] \quad (1)$$

where $\Delta$ is the amount of energy that is exchanged and M is the maximum number of steps in the presented Markov chain. Thus, the total capacity of the energy storage system can be defined as:

$$C=M \cdot \Delta \quad (2)$$

In addition, the transition probability matrix of FIG. 1 can be found as:

$$P = \begin{bmatrix} k_{11} & p_1 & p_2 & \cdots & & \\ p_{-1} & 0 & p_1 & \cdots & & \\ p_{-2} & p_{-1} & \cdots & \cdots & & \\ \cdots & \cdots & \cdots & \cdots & & \\ & & p_{-1} & 0 & p_1 \\ & & p_{-2} & p_{-1} & k_{nn} \end{bmatrix}_{N \times N} \quad (3)$$

Then, limiting probabilities can be found using the following definition.

$$\pi = \pi P \quad (3)$$

where $\pi$ is the stationary distribution. Since limiting probabilities show the probabilities of being at certain state in a Markov chain, the loss of load probability (LOLP) can be defined as $$\pi_E = \sum_{i \in \{1,M\}} p_{-i} \times \sum_{j<L} \pi_j \quad (4)$$

where L is the average value of load. $\pi_E$ represents LOLP by multiplying the sum of probabilities of discharging in any amount and the sum of limiting probabilities of the states that cannot match the power which load requires. Finally, The relationship between LOLP and energy storage capacity can be found by varying the number of total states and determining how LOLP changes with regard to the change.

Next, an MCS-based availability evaluation process is detailed where the availability of microgrids with different configurations is determined. The MCS method evaluates availability by determining the sets of system components that will introduce a system failure. Hence, if all components in the found set fail, it is determined as a system failure. On the other hand, if there is one or more components not failing in the set, there will not be a system failure. The MCS method is selected to evaluate the availabilities of different system architectures because this approach gives the benefit of having simplicity in availability calculation, particularly when there are a large number of components in the system. When components have high availability, microgrids unavailability, $U_{MG}$, can be accurately approximated as:

$$U_{MG} \cong \Sigma_{j=1}^{M_c} P(K_j) \quad (5)$$

where $M_c$, $K_j$, and $P(K_j)$ represent the total number of MCS, the MCS, and the MCS probability, respectively.

Figure 3:
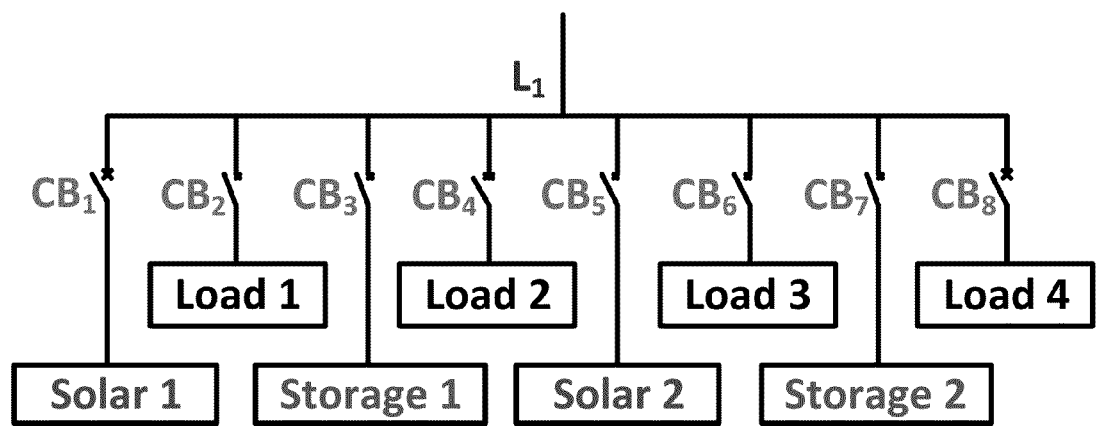
FIGS. 3-5 present radial, ring, and ladder microgrid architectures, respectively.
Figure 4:
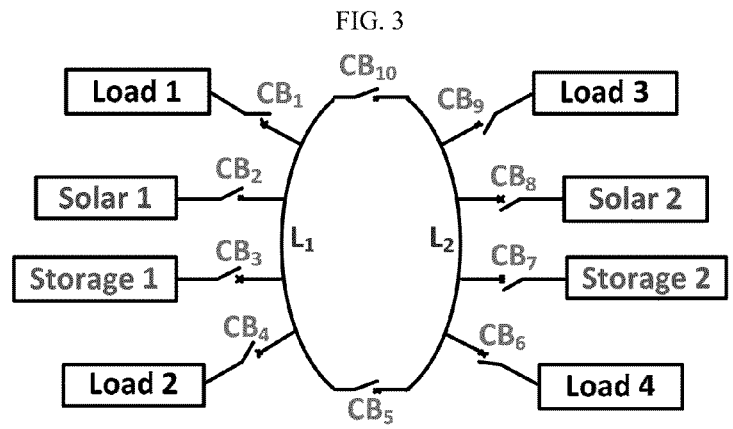
Figure 5:
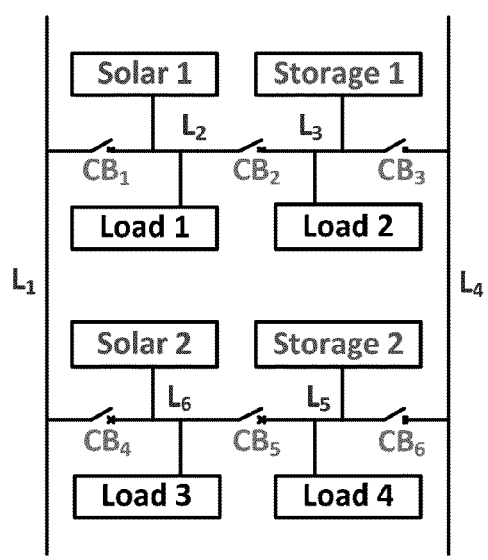

FIGS. 3-5 present radial, ring, and ladder microgrid architectures, respectively. As shown, circuit breakers (CBs) are used to protect each component. Since open circuit failures are very rare in power systems and usually ignored, and short circuit faults are the dominant source of component failures 21], only short circuit failures are considered in the simulation. Both passive event, i.e. a component failure that does not have an impact on the remaining healthy part of the system, and active event, i.e. a component failure that cause the removal of other healthy components of the system, are considered in the calculation of reliability indices. In FIGS. 3-5, Solar #1 & #2 represent the photovoltaic (PV) generation and Storage #1 & #2 represent energy storage system. When demonstrating the simulations, both PV generations are assumed to have the same amount of generation capacity (1 MW), and both storages are assumed to have the same amount of capacity (1 MW) as well.

Table I to Table III presents the MCS of the radial, ring, and ladder microgrid architectures, respectively. MCS in each table are determined for Load #1 (FIGS. 2 to 4), i.e. MCS is configured if the microgrid fails to supply Load #1. Then, system availability can be evaluated after determining availabilities for every load in the system. This process is not a time consuming process since many MCS overlap within the same architecture.

As shown in Table I, there are 8 MCS for the radial type system architecture shown in FIG. 1. MCS #1 represents the failure of a bus that connects all components in the shown radial-type system architecture. As it can be seen, the whole system fails when bus $L_1$ fails. That means not a single generation nor storage device is able to be connected with any load due to the failure of bus $L_1$. MCS #2 represents the failure of a single CB. When any CB fails to operate, other CBs will be opened to protect the connected components. This active event will result in a loss of load since there will not be any power flowing within the system. Therefore, the CB unavailability ($u_{CB}$) is multiplied by eight for MCS #2 to consider failure of all eight CBs in the system. MCS #3 represents the unavailability even when all components of the system are healthy and have no failure. In other words, MCS #3 does not describe the failure rates of component, however, describes the unavailability of power resources including energy storage system. For example, when there is no solar generation, or storage level is not enough to supply the load, the system is considered unavailable even there is no failure within the system.

TABLE I

MCS DESCRIPTION, PROBABILITY, AND QUANTITY FOR THE RADIAL-TYPE SYSTEM ARCHITECTURE SHOWN IN FIG. 3

| # | Minimal cut sets | Quantity and probability of occurrence |
|---|---|---|
| 1 | $\{L_1\}$ | $u_L$ |
| 2 | $\{CB_1\}, \{CB_2\}, \{CB_3\}, \{CB_4\},$ $\{CB_5\}, \{CB_6\}, \{CB_7\}, \{CB_8\}$ | $(8)(u_{CB})$ |
| 3 | $\{U_{2S2E}\}$ | $u_{2S2E}$ |
| 4 | $\{U_{2S1E}, E_1\}, \{U_{2S1E}, E_2\}$ | $(2)(u_{2S1E}u_E)$ |
| 5 | $\{U_{2S0E}, E_1, E_2\}$ | $u_{2S0E}u_E^2$ |
| 6 | $\{U_{1S2E}, S_1\}, \{U_{1S2E}, S_2\}$ | $(2)(u_{1S2E}u_S)$ |
| 7 | $\{U_{1S1E}, S_1, E_1\}, \{U_{1S1E}, S_1, E_2\},$ $\{U_{1S1E}, S_2, E_1\}, \{U_{1S1E}, S_2, E_2\}$ | $(4)(u_{1S1E}u_S u_E)$ |
| 8 | $\{U_{1S0E}, S_1, E_1, E_2\},$ $\{U_{1S0E}, S_2, E_1, E_2\}$ | $(2)(u_{1S0E}u_S u_E^2)$ |

TABLE II

| # | Minimal cut sets | Quantity and probability of occurrence |
|---|---|---|
| 1 | $\{L_1\}$ | $u_L$ |
| 2 | $\{CB_1\}, \{CB_2\}, \{CB_3\}, \{CB_4\},$ $\{CB_5\}, (CB_{10})$ | $(6)(u_{CB})$ |
| 3 | $\{U_{2S2E}\}$ | $u_{2S2E}$ |
| 4 | $\{U_{2S1E}, E_1\}, \{U_{2S1E}, E_2\}$ | $(2)(u_{2S1E}u_E)$ |
| 5 | $\{U_{2S0E}, E_1, E_2\}$ | $u_{2S0E}u_E^2$ |
| 6 | $\{U_{1S2E}, S_1\}, \{U_{1S2E}, S_2\}$ | $(2)(u_{1S2E}u_S)$ |
| 7 | $\{U_{1S1E}, S_1, E_1\}, \{U_{1S1E}, S_1, E_2\},$ $\{U_{1S1E}, S_2, E_1\}, \{U_{1S1E}, S_2, E_2\}$ | $(4)(u_{1S1E}u_S u_E)$ |
| 8 | $\{U_{1S0E}, S_1, E_1, E_2\},$ $\{U_{1S0E}, S_2, E_1, E_2\}$ | $(2)(u_{1S0E}u_S u_E^2)$ |

TABLE III

MCS DESCRIPTION, PROBABILITY, AND QUANTITY FOR THE LADDER-TYPE SYSTEM ARCHITECTURE SHOWN IN FIG. 5

| # | Minimal cut sets | Quantity and probability of occurrence |
|---|---|---|
| 1 | $\{L_2\}$ | $u_L$ |
| 2 | $\{S_1\}$ | $u_S$ |
| 3 | $\{CB_1\}, \{CB_2\}$ | $(2)(u_{CB})$ |
| 4 | $\{U_{2S2E}\}$ | $u_{2S2E}$ |
| 5 | $\{U_{2S1E3L}, E_1\}, \{U_{2S1E3L}, E_2\}$ | $(4)(u_{2S1E3L}u_{CB}^2)$ |
| 6 | $\{U_{2S0E2L}, E_1, E_2\}$ | $u_{2S0E2L}u_{CB}^2$ |
| 7 | $\{U_{1S2E3L}, S_2\}$ | $u_{1S2E3L}u_{CB}^2$ |
| 8 | $\{U_{1S1E2L}, S_2, E_2\}$ | $u_{1S1E2L}u_{CB}^2$ |
| 9 | $\{U_{1S0E1L}, S_2, E_1\}$ | $u_{1S0E1L}u_{CB}^2$ |

TABLE V

SIMULATION INPUT INFORMATION

| Item | Capacity (KW) |
|---|---|
| PV Generation Capacity (Ea.) | 1000 (avg. generation = 317) |
| Energy Storage Capacity (Ea.) | 1000 |
| Load (Ea.) | 73 (avg.)/153 (max.) |

TABLE IV

AVAILABILITY VALUES OF COMPONENTS USED IN THE NUMERICAL EXAMPLES

| Item | Availability (a) | Unavailability (u) |
|---|---|---|
| Line [21] | 0.99999714 | $u_L$ |
| Circuit Breaker [21] | 0.99998858 | $u_{CB}$ |
| Photovoltaic Module$^\alpha$ [22] | 0.99998965 | $u_S$ |
| Energy Storage (Battery) [23] | 0.99996742 | $u_E$ |
| Power Generation (2S,2E)$^\beta$ | 0.99994965 | $u_{2S2E}$ |
| Power Generation (2S,2E)$^\gamma$ | 0.99999102 | |
| Power Generation (2S,1E)$^\beta$ | 0.93001899 | $u_{2S1E}$ |
| Power Generation (2S,1E)$^\gamma$ | 0.99999102 | |
| Power Generation (2S,0E)$^\beta$ | 0.71300000 | $u_{2S0E}$ |
| Power Generation (2S,0E)$^\gamma$ | 0.72450000 | |
| Power Generation (1S,2E)$^\beta$ | 0.98158568 | $u_{1S2E}$ |
| Power Generation (1S,2E)$^\gamma$ | 0.99998437 | |
| Power Generation (1S,1E)$^\beta$ | 0.90100770 | $u_{1S1E}$ |
| Power Generation (1S,1E)$^\gamma$ | 0.99998437 | |
| Power Generation (1S,0E)$^\beta$ | 0.51140000 | $u_{1S0E}$ |
| Power Generation (1S,0E)$^\gamma$ | 0.52030000 | |
| Power Generation (2S,1E)-3L$^\beta$ | 0.95678675 | $U_{2S1E3L}$ |
| Power Generation (2S,1E)-3L$^\gamma$ | 0.99999260 | |
| Power Generation (2S,0E)-2L$^\beta$ | 0.84630000 | $u_{2S0E2L}$ |
| Power Generation (2S,0E)-2L$^\gamma$ | 0.84040000 | |
| Power Generation (1S,2E)-3L$^\beta$ | 0.99979973 | $u_{1S2E3L}$ |
| Power Generation (1S,2E)-3L$^\gamma$ | 0.99998729 | |
| Power Generation (1S,1E)-2L$^\beta$ | 0.99995558 | $u_{1S1E3L}$ |
| Power Generation (1S,1E)-2L$^\gamma$ | 0.99999067 | |
| Power Generation (1S,0E)-1L$^\beta$ | 0.84430000 | $u_{1S0E1L}$ |
| Power Generation (1S,0E)-1L$^\gamma$ | 0.84060000 | |

$^\alpha$Repair time was assumed to be 50 hours.
$^\beta$Acquired by the Markov chain model [14]
$^\gamma$Acquired by the traditional model (0 or 1)

In this example, $u_{2S2E}$ of MCS #3 represents the unavailability when all components—two PV sources and two energy storage systems—are working in order.

MCS #14 represents a case that one of the two energy storage systems is failed to operate as storage. In this case, the unavailability of power resources which includes two PV sources and one energy storage system is evaluated. This unavailability, $u_{2S1E}$,—i.e. a case that one of two energy storage is failed to operate—will be greater than that of $u_{2S2E}$ because there is less amount of space to store the energy within the system. In addition, when any of two energy storages fail to operate, it is assumed that the CB connected to that storage opens to protect the system. In a same manner, the rest of unavailability can be found for other MCS shown in Table I and II.

Particularly, Table III has different MCS from the previous ones. This is because a ladder-type system architecture has a different approach to connect power resources and loads. Unlike the other architectures, Load #1 is directly connected to Solar #1, and can be disconnected from the rest of the system by $CB_1$ and $CB_2$, as shown in FIG. 4. This is shown as MCS #2, $u_S$, which is PV source unavailability. With this type of connection, the total number of CBs may be reduced; however, this gives a greater possibility of a failure to supply the load with regard to generation resources failures. In other words, this is not inability to supply the load because of weather condition or lacking energy in storage, but a fault occurred with the operation of a power resource. Moreover, MCS #5-9 include unavailability with the information of how many loads are connected to that generation. This information is given only for the ladder-type architecture because when a PV source or storage fails to operate, the attached load also fails to get power from any resource. For example, if Storage #1 in FIG. 4 fails to operate, Load #2 will automatically have no power since connected components without any CB will have a failure due to the failure of Storage #1. In other words, when Storage #1 fails, CB #2 and 3 will be opened to protect the system, and Load #2 will fail to receive power. Since MCS are determined from the perspective of Load #1, the unavailability becomes $u_{2S1E3L}$. As a result, $u_{2S1E3L}$ will be slightly less than $u_{2S1E}$ because two PV generation resources and one energy storage are required to power only three loads instead of four loads. This case is shown as MCS #5. MCS #6-9 are determined with the same approach that is used for MCS #5.

Next, simulation results are discussed. Table IV shows the availability values that are used to conduct simulations. As mentioned, only short circuit failures were taken into account for CBs in the availability calculation. In addition, the availabilities of power generation with different amount of PV and energy storage are evaluated using two different energy storage system models: the Markov chain model and traditional energy storage model that is used in power system study. The Markov chain model which was introduced in Section II models charging/discharging process using states defined by energy levels. On the other hand, traditional energy model does not take charging/discharging processes into account. Hence, for traditional storage model, if energy storage system is available, i.e. working in order, the storage is regarded as a fully charged storage. Vice versa, if energy storage system is not available, i.e. fail to operate, the storage is regarded empty. This strategy results only two states, 0 and 1, which introduce overestimated availabilities since it assumes that energy storage is fully charged whenever the storage is working in order. As shown in Table IV, availabilities that are found with traditional storage model are slightly higher than that of power generation which used Markov chain energy storage model.

The capacity values of each PV generation and energy storage system can be used for the simulation. In order to investigate the impact of using different architectures, the total capacity of power generation and storage and the total amount of load in all architectures are equal. With an assumption of having 1 MW capacity of PV panels, solar insolation data set collected in Milford, Utah is used to generate one year PV generation profile which is also shown in FIG. 5. Moreover, residential load profiles collected in the State of New Hampshire, were used for the simulations. Each load shown in FIGS. 3-5 is assumed to have 100 housings; hence, the average value for each load (100 housings) was 73 KW, and the maximum value was 153 KW in the simulation.

The foregoing system to evaluate microgrids' availability using a Markov chain energy storage model and minimum cut sets (MCS) enables users to evaluate microgrids availability in more realistic way than the traditional method which does not take charging/discharging processes into account. Simulation results show that the proposed method provides more realistic estimation of the system availability compared to two-state model. Table VI and VII present the simulation results using the Markov chain model and a traditional two-state (charged/discharged or available/not-available states) model for energy storage system, respectively. Availability of each load is evaluated and presented in these tables. When the total availability was determined for each system, it was assumed that if any load fails to acquire power, it is considered as a loss of load for the whole system. As shown, the traditional energy storage model results higher availabilities. Hence, the total availability evaluated with traditional model is higher than that with Markov chain model. This shows that not considering the charging/discharging process may result overestimated availabilities when energy storage is included in microgrids. When different architectures are compared, it can be seen that the ladder-type system in FIG. 5 has the highest availability even with using the least number of CBs compared to other architectures. The ladder-type architecture may be considered fragile as power sources are connected to loads directly without any protection system, e.g. CB, but as the failure rates of power generation resources are very low the system has better availability than that of other architectures. Notice that the results may change when different unavailability values are used for each component; however, since MCS of system architectures do not change, the total availability can be easily found by few modifications.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 6:
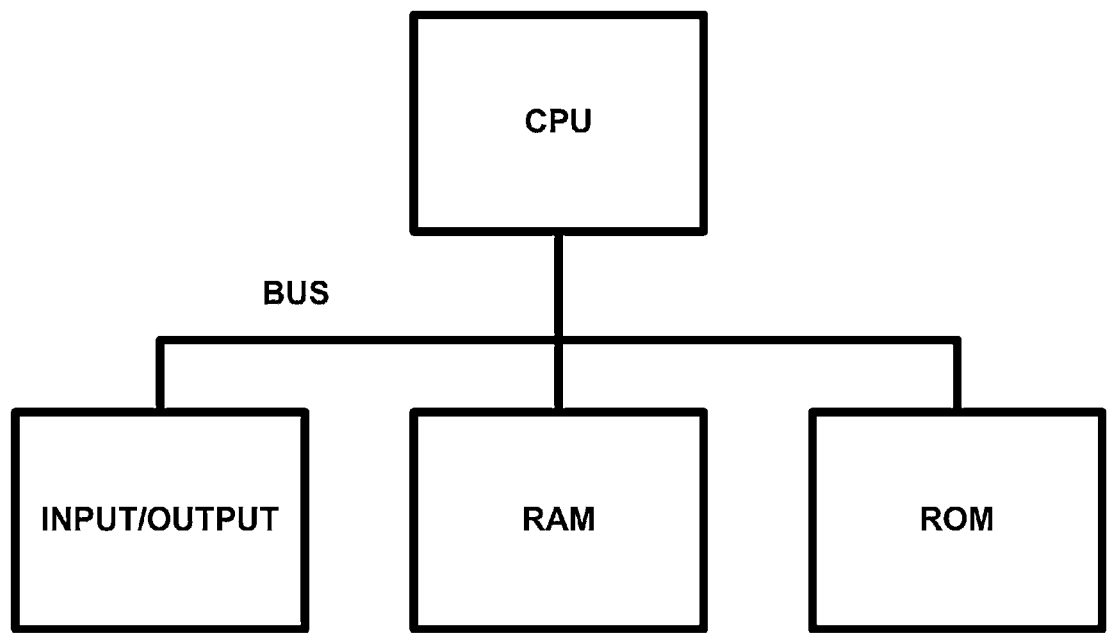
FIG. 6 shows an exemplary computer system.

By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for availability evaluation of microgrid systems with an energy storage device, comprising:
applying a Markov chain model to model charging and discharging processes in the energy storage device;
determining a transition probability matrix in the Markov chain model as:

$$P = \begin{bmatrix} k_{11} & p_1 & p_2 & \cdots \\ p_{-1} & 0 & p_1 & \cdots \\ p_{-2} & p_{-1} & \cdots & \cdots \\ \cdots & \cdots & \cdots & \cdots \\ & p_{-1} & 0 & p_1 \\ & p_{-2} & p_{-1} & k_{nn} \end{bmatrix}_{N \times N}$$

where:

p1 is a probability of transition between consecutive states going from lower to higher states;

p−1 is a probability of transition between consecutive states going from higher to lower states;

p2 is a probability of transition between alternate states going from lower to higher states;

p−2 is a probability of transition between alternate states going from higher to lower states;

$k_{nn}$ is the probability of maintaining the nth state;

N is the number of states;

P is a matrix that contains these probabilities to determine absolute probability of occurrence of each state;

determining an effect of the energy storage device connected to a microgrid with multiple energy sources and loads; and determining effect of system architectures on the availability of microgrids using minimum cut sets (MCS).

2. The method of claim 1, comprising generating an energy storage model for reliability evaluation.

3. The method of claim 2, wherein the model comprises a probabilistic model.

4. The method of claim 1, comprising applying a Markov Chain based model.

5. The method of claim 4, wherein the Markov Chain model comprises two states.

6. The method of claim 1, wherein the Markov Chain model comprises a multi-state model that considers charging and discharging states of a storage device.

7. The method of claim 1, wherein the model comprises a deterministic model.

8. The method of claim 1, comprising performing availability evaluation of system architecture.

9. The method of claim 8, comprising modeling components in parallel or in series or in combination.

10. The method of claim 9, comprising applying a deterministic model.

11. The method of claim 9, comprising performing series or parallel modeling.

12. The method of claim 9, comprising applying a probabilistic model.

13. The method of claim 12, comprising applying analytical methods including Boolean algebra or a cut set.

14. The method of claim 12, comprising applying a statistical method.

15. The method of claim 12, comprising applying a Markov-chain Monte Carlo simulation.

16. The method of claim 12, comprising applying a sequential simulation.

17. The method of claim 12, comprising applying an event tree.

18. The method of claim 8, wherein no modeling is required.

19. The method of claim 1, comprising:

determining a state space of (X−L) for the energy storage system as $S = [-M\Delta, -(M-1)\Delta, \ldots, -2\Delta, -\Delta, 2\Delta, \ldots, (M-1)\Delta, M\Delta]$ where X and L are the total amount of generated power and load, $\Delta$ is the amount of exchanged energy and M is the maximum number of steps in the presented Markov chain; and determining the total capacity of the energy storage system as $C = M \cdot \Delta$.

20. The method of claim 1, comprising determining a loss of load probability (LOLP) as $\pi_E = \Sigma_{i \in (1,M)} p-1 \times \Sigma_{j<L} \pi_j$ where L is an average value of load, $\pi_E$ represents LOLP by multiplying the sum of probabilities of discharging in any amount and the sum of limiting probabilities of states that cannot match the power which a load requires.

* * * * *